US010045425B2

United States Patent
Rozendaal et al.

(10) Patent No.: US 10,045,425 B2
(45) Date of Patent: Aug. 7, 2018

(54) LIGHT EFFECT CONTROL

(71) Applicant: PHILIPS LIGHTING HOLDING B.V., Eindhoven (NL)

(72) Inventors: Leendert Teunis Rozendaal, Eindhoven (NL); Aloys Hubbers, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/516,863

(22) PCT Filed: Oct. 9, 2015

(86) PCT No.: PCT/EP2015/073473
§ 371 (c)(1),
(2) Date: Apr. 4, 2017

(87) PCT Pub. No.: WO2016/055648
PCT Pub. Date: Apr. 14, 2016

(65) Prior Publication Data
US 2017/0311415 A1    Oct. 26, 2017

Related U.S. Application Data

(60) Provisional application No. 62/062,203, filed on Oct. 10, 2014.

(30) Foreign Application Priority Data

Oct. 23, 2014 (EP) ..................................... 14189991

(51) Int. Cl.
*H05B 37/02*    (2006.01)
*A63F 13/23*    (2014.01)
(Continued)

(52) U.S. Cl.
CPC ....... *H05B 37/0227* (2013.01); *A63F 13/216* (2014.09); *A63F 13/235* (2014.09);
(Continued)

(58) Field of Classification Search
None
See application file for complete search history.

(56) References Cited

U.S. PATENT DOCUMENTS 8,475,275 B2 * 7/2013 Weston .................. A63H 30/04
                                                    463/30
9,039,533 B2 * 5/2015 Barney .................. A63H 30/04
                                                    463/36
(Continued)

FOREIGN PATENT DOCUMENTS

WO    WO2007113737A1    A1    10/2007

*Primary Examiner* — Vibol Tan

(57) ABSTRACT

A light effect control method, computer program product and device are presented which allow an application to render a light effect by a networked lighting system based on the method, computer program product or device receiving an event being from the application. To provide a better user experience, light effects related to certain events need to be rendered even if a delay in rendering is expected whereas light effects related to other events need to be rendered without delay or else not rendered at all. As such, a decision is made to execute a first or a second scenario based on the event type of the event received and/or the capacity of the networked lighting system, wherein in the first scenario the lighting control command is always sent to the networked lighting system and in the second scenario the lighting control command is only sent to the networked lighting system if no unacceptable delay in rendering the light effect is expected.

15 Claims, 6 Drawing Sheets

(51) Int. Cl.
*A63F 13/327* (2014.01)
*A63F 13/85* (2014.01)
*A63F 13/235* (2014.01)
*A63F 13/216* (2014.01)
*A63F 13/25* (2014.01)
*A63F 13/28* (2014.01)
*H04L 29/08* (2006.01)

(52) U.S. Cl.
CPC ............. *A63F 13/25* (2014.09); *A63F 13/28* (2014.09); *A63F 13/327* (2014.09); *A63F 13/85* (2014.09); *H05B 37/0272* (2013.01); *H04L 67/12* (2013.01)

(56) References Cited

U.S. PATENT DOCUMENTS

| | | | | |
|---|---|---|---|---|
| 9,393,500 | B2* | 7/2016 | Barney | A63H 30/04 |
| 9,485,841 | B1* | 11/2016 | Wein | A63H 37/00 |
| 9,566,510 | B2* | 2/2017 | Schlossberg | A63F 13/27 |
| 9,616,335 | B2* | 4/2017 | Schlossberg | A63F 13/27 |
| 9,756,706 | B2* | 9/2017 | Breuer | H05B 37/0272 |
| 9,763,311 | B2* | 9/2017 | Huang | H05B 37/0272 |
| 9,770,652 | B2* | 9/2017 | Barney | A63F 13/245 |
| 9,826,601 | B2* | 11/2017 | Vangeel | G06F 8/665 |
| 9,884,249 | B2* | 2/2018 | Schlossberg | A63F 13/235 |
| 2011/0285854 | A1 | 11/2011 | Laduke et al. | |
| 2014/0035482 | A1 | 2/2014 | Rains, Jr. et al. | |
| 2014/0104293 | A1 | 4/2014 | Li et al. | |
| 2014/0104498 | A1 | 4/2014 | Li et al. | |

* cited by examiner

LIGHT EFFECT CONTROL

CROSS-REFERENCE TO PRIOR APPLICATIONS

This application is the U.S. National Phase application under 35 U.S.C. § 371 of International Application No. PCT/EP2015/073473, filed on Oct. 9, 2015, which claims the benefit of European Patent Application No. Oct. 23, 2014 and U.S. Patent Application No. 62/062,203, filed on Oct. 10, 2014. These applications are hereby incorporated by reference herein.

FIELD OF THE INVENTION

The present invention relates to methods for light effect control and more in particular to a computer implemented method for allowing an application to render a light effect via a networked lighting system. The present invention further relates to control devices for light effect control and more in particular to a networked lighting system control device for controlling a lighting device in a networked lighting system.

BACKGROUND OF THE INVENTION

Traditional lighting systems are typically stand-alone systems that offer on/off or dim-level control of a single color of light (e.g. white) via a physical switch. Recent developments have led to modern lighting systems that, for example, can emit various colors and can be controlled over a wireless network using a smart phone. Although such modern lighting systems offer advantages, they are far more complex than traditional lighting systems from a controls perspective. As an example, when in a traditional lighting system a physical switch is turned on, power to a lighting device is provided, and the lighting device turns on virtually instantly. In the modern lighting system of the example above, user input related to switching a lighting device on is captured via a user interface of a smart phone, a command is sent via the smart phone over one or more networks to the lighting system after which the lighting device responds to the received command by proceeding to emit light. In various implementations, additional steps, not mentioned above, need to be taken to effectuate control of the lighting device. Such complexity can introduce undesired effects, such as unpredictability related to the execution of lighting control commands and rendering of related light effects. There is a need for an improved lighting system that mitigates or avoids at least some of these undesired effects.

SUMMARY OF THE INVENTION

Inventors have realized that in networked lighting systems, lighting control commands can, for example, get lost (e.g. dropped due to network load or buffer overflows in a network component) or be delayed (e.g. lag as a result of network load). It is an object of the present invention to provide a (computer implemented) method for allowing an application to render a light effect via a networked lighting system. It is a further object of the present invention to provide a computer program product and a networked lighting system control device for controlling a lighting device in a networked lighting system.

In a first aspect of the invention, a (computer implemented) method according to the invention is provided for allowing an application to render a light effect via a networked lighting system. The method comprises: receiving an event from the application, the event related to a light effect for being rendered by the networked lighting system, determining an event type, from a set of event types, of the event received, wherein the set of event types comprises at least a first event type and a second event type, determining a capacity of the networked lighting system for executing a lighting control command, selecting for execution a scenario from a set of scenarios based on the determined capacity of the networked lighting system and the determined event type, the set of scenarios comprising at least a first and a second scenario, and executing the selected scenario, wherein the first scenario comprises sending one or more lighting control commands for rendering the light effect related to the event received to the networked lighting system and the second scenario comprises dismissing the event received by not sending a lighting control command to the networked lighting system. The method can be implemented, for example, as an Application Programming Interface (API) as part of a lighting engine or embedded in a hardware device, such as a bridge of a networked lighting system. The method allows to effectively dismiss certain events received, based on one or more of: the event type of the event received and the determined capacity of the networked lighting system. When used to prevent an overload situation of the networked lighting system, such as a situation where commands get lost in the networked lighting system (e.g. dropped due to network load or buffer overflows in a network component), the method can make the operation of the networked lighting system more predictable. For example, instead of an unpredictable or random pattern of lighting control commands being dropped by the networked lighting system, specific types of events are effectively dismissed and as such lighting control commands related to these events are not sent to the networked lighting system. To provide a better user experience, the events that are effectively dismissed, can be selected from a number of event types such that only event types that have limited impact on the user experience are not rendered by the networked lighting system in an overload situation. This can allow for a more optimal use of the capacity of the networked lighting system, for example, by increasing the likelihood of events of an event type that have a large impact on the user experience to be rendered successfully.

In an embodiment of the computer implemented method according to the invention the set of scenarios further comprises a third scenario comprising: determining an approximate light effect based on the light effect related to the event received, and sending one or more lighting control commands, for rendering the approximate light effect, to the networked lighting system. This is beneficial as, for example, an approximate light effect can be determined that uses less capacity of the networked lighting system or a single approximate light effect can replace multiple light effects. In a further embodiment the number of lighting control commands required to render the light effect related to the event received is greater than the number of lighting control commands required to render the approximate light effect. This is beneficial as less capacity of the networked lighting system can then be used when rendering the approximate light effect than in a situation where the light effect related to the received event would be rendered by the networked lighting system. In yet a further embodiment, the number of lighting devices required to render the approximate light effect is smaller than the number of lighting devices required to render the light effect related to the event received. This is beneficial as a control command related to the approximate light effect would need to reach fewer lighting devices in the networked lighting system than in a situation where a control command would be sent to all lighting devices related to the light effect related to the received event. For example, when each lighting device that needs to be reached requires an individual control command (e.g. a unicast message) to be sent, then less control commands would need to be sent; and if multiple lighting devices are reached by a single control command (e.g. a multicast or broadcast message), then in a networked lighting system where messages are relayed by lighting devices to each other, the time needed to spread the message in the network could be less than in a situation where a control command would be sent to all devices related to the light effect related to the received event.

In various embodiments of the method according to the invention: determining the capacity of the networked lighting system is based on a predetermined value indicative of an expected number of lighting control commands for which the networked lighting system has capacity; determining the capacity of the networked lighting system is based on a first predetermined value indicative of an expected number of lighting control commands of a first type for which the networked lighting system has capacity and a second predetermined value indicative of an expected number of lighting control commands of a second type for which the networked lighting system has capacity; determining the capacity of the networked lighting system is based on a number of lighting control commands stored in a buffer of a device in the networked lighting system; or determining the capacity of the networked lighting system is based on measuring the amount of network traffic present in the networked lighting system. Each of these embodiments provides benefits related to, for example, balancing the effort required to determine the capacity of the networked lighting system for executing a lighting control command and the quality of the determined capacity (e.g. the level of detail of the determination made or the likelihood of the determination made being correct). In an implementation of a networked lighting system, multiple applications and user actions can relate to control commands being sent to lighting devices. In determining the capacity of the networked lighting system these can be taken into account (e.g. by determining the number of applications requesting access to the networked lighting system or by negotiating between applications the number and/or type of control commands each application is allowed to send to the networked lighting system over a predetermined time period).

In an embodiment of the method according to the invention, the first scenario is executed when the event received is of the first event type, wherein the first event type relates to a light effect for which successful rendering by the networked lighting system is of high importance. This is beneficial as an implementation of the method will, for an event of the first event type, send out a lighting control command to the networked lighting system to render the light effect related to the received event even when the capacity of the networked lighting system is determined to be insufficient (e.g. a delay for executing the lighting control command is expected or there is a certain likelihood that the control command will not reach the lighting device). This provides for a larger likelihood of the light effect being rendered by the networked lighting system than when no control command for rendering the light effect is sent to the networked lighting system. In a further embodiment of the method according to the invention, the second scenario is executed when the event received is of the second event type, and the determined capacity of the networked lighting system is indicative of an expected delay, above a predetermined threshold, in rendering the light effect related to the event received, wherein the second event type relates to a light effect for which timely rendering by the networked lighting system is of high importance. This is beneficial as an implementation of the method will, for an event related to the second event type, send out a lighting control command to the networked lighting system to render the light effect related to the received event when the capacity of the networked lighting system has been determined to be sufficient (e.g. no or an acceptable delay for executing the lighting control command is expected). This can prevent the light effect from being rendered too late when instead it is more beneficial, from a user experience for example, not to render the light effect rather than rendering it with a certain delay.

In yet a further embodiment of the method according to the invention, the light effect for which successful rendering by the networked lighting system is of high importance relates to a lighting scene change based on a virtual character moving, in a virtual environment provided by the application, from a first location to a second location, wherein the first location is related to a first lighting scene and the second location is related to a second lighting scene different from the first lighting scene. The method according to the invention, can be used for rendering light effects by a networked lighting system (e.g. a general lighting system) based on a virtual environment provided by the application. In, for example, a computer game, a virtual character, such as a computer game character, can be controlled by a user. The computer game character can move around in a virtual environment, such as a level in a computer game. When the computer game character moves from a first location (e.g. indoors in the virtual environment) related to a first lighting scene (e.g. dimmed white light) to a second location (e.g. outdoors in the virtual environment) related to a second lighting scene (e.g. bright white light), then the lighting conditions in the room where the user is playing the computer game can be adapted to reflect the lighting scene change in order to provide a better (e.g. more encompassing) user experience. It is important that a scene change is effectuated, as it would seem strange to a user when sometimes the lighting conditions remain constant even though the scene changes and other times the lighting conditions reflect the scene change. The timing of executing the scene change in the networked lighting system however can be less important than the fact that the scene change is effectuated (e.g. it is better to render the light effect with a delay than not to render it at all). There can however also be light effects for which timely rendering is more important. In yet another embodiment of the method according to the invention, the light effect for which timely rendering by the networked lighting system is of high importance relates to a lighting feedback triggered by an event occurring in virtual environment provided by the application. Continuing the example of the computer game, the computer game character can interact with, for example, objects in the virtual environment. When the user controls the computer game character to jump onto a pedestal, for example, this can cause the user to collect points in the computer game. Lighting feedback can be provided related to this event and for such lighting feedback it can be important that the light effect is rendered with little delay, such that a video output rendered by the computer game and light effects rendered by the networked lighting system appear synchronized to the user. The timing of rendering the light effect in the networked lighting system can in this case be more important than the fact that the light effect is rendered (e.g. it is better to not render the light effect than to render the light effect with an unacceptable delay).

In an embodiment of the computer implemented method according to the invention, the networked lighting system comprises one or more lighting devices arranged for receiving lighting control commands over a mesh network, such as ZigBee (Light Link), and wherein sending a lighting control command, for rendering the light effect related to the event received, comprises sending a message over the mesh network, such as ZigBee (Light Link). It is beneficial to apply this method when a ZigBee (Light Link) or other (mesh network type) wireless network is used by the networked lighting system, as in such networked lighting systems the capacity of the networked lighting system can be a more relevant factor in providing a satisfactory user experience when rendering light effects than in wired networks, due to, for example, capacity limitations of the networked lighting system.

In a network, such as a mesh network, commands can be sent as, for example, unicast or broadcast messages. A unicast message is destined for a single node on a network, such as a single lighting device in the networked lighting system. A broadcast messages is sent to all nodes in a network. In a mesh network a broadcast message can be replicated to allow all nodes to receive it (e.g. the node that originates the broadcast messages can reach a first set of nodes in the network, yet not all nodes and therefore each node further propagates the message). Network capacity can be influenced by the type of message that is transmitted over the network. Typically a broadcast message takes up more capacity as more nodes are involved and the messages reaches some node more than once.

In a second aspect of the invention, a computer program product is provided, the computer program product comprising program code for causing a computer to carry out the method of any of the preceding claims when the computer program product is carried out on the computer. The computer program product can be implemented, for example, as a lighting engine on a computer gaming system, a desktop or laptop personal computer, a tablet or smart phone or any other type of computing device. It can be provided as a piece of installed software, an optionally downloadable component, an application in an application store, etc.

In a third aspect of the invention, a networked lighting system control device is provided, the networked lighting system control device arranged for controlling a networked lighting system. The networked lighting system control device comprises: an input arranged for receiving an event related to a light effect for being rendered by the lighting device, a network interface arranged for sending a lighting control command to the lighting device, and a processor operationally coupled to the input and the network interface. The processor is arranged for: determining an event type, from a set of event types, of the event received, wherein the set of event types comprises at least a first event type and a second event type, determining a capacity of the networked lighting system for executing a lighting control command, selecting for execution a scenario from a set of scenarios, based on the determined capacity of the network and the determined event type, wherein the set of scenarios comprises at least a first and a second scenario, and executing the selected scenario. The first scenario comprises sending one or more lighting control commands for rendering the light effect related to the event received to the networked lighting system, and the second scenario comprises dismissing the event received by not sending a lighting control command to the networked lighting system. Such a control device can be a bridge that can control lighting devices in a networked lighting system, a component (e.g. a general purpose processor) in a computer gaming system, etc.

It shall be understood that the (computer implemented) method, the computer program product and networked lighting system control device, have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
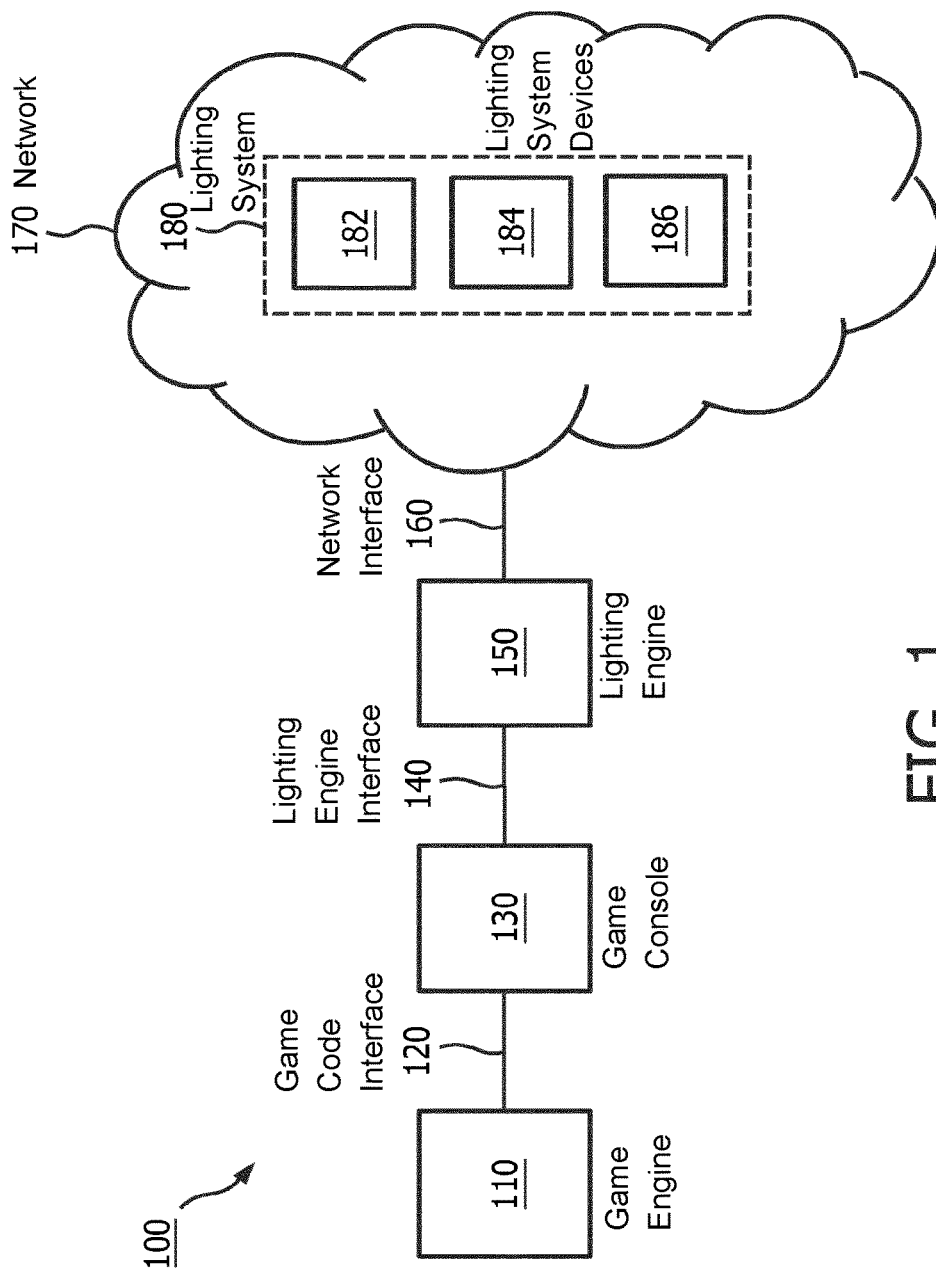
FIG. 1 shows schematically and exemplarily an overview of an application interfacing a lighting system.

In FIG. 1 an overview 100 is provided showing a game engine 110 arranged for interfacing over a game engine to game code interface 120 with game code 130, the game code 130 further interfaced over a game code to lighting engine interface 140 to a lighting engine 150. The lighting engine 150 is further arranged for interfacing over a network interface 160 to a network 170 comprising a lighting system 180. The lighting system, in this example, comprising various lighting system devices 182, 184, 186. As an example, the game code 130 can initiate an action to be executed by the game engine 110 by calling a routine over the interface 120 that causes movement of a character in the video output of a computer game and initiate an action to be executed by the lighting engine 150 by using an API offered by the lighting engine 150 over the interface 140 that is intended to create a light effect rendered by at least one lighting system device 182, 184, 186 in the lighting system 180. The game code 130 can comprise code that causes a character in the video output of the computer game to walk from a dark forest into a brightly lit building and related to this control a lamp, in the room where the user is playing the computer game, to increase its brightness.

Although this example refers to a game engine 110 and game code 130, the lighting engine 150 could interface other types of code, applications, etc. For example, light effects can be rendered by the lighting engine 150 based on triggers occurring in an light effects enriched video that a user is watching, light effects can be rendered by the lighting engine 150 based on actions taken by a user in a word processing application, light effects can be rendered in relation to events occurring in an application used by another user, or light effects can be rendered based on an event occurring on a network or in the cloud.

Figure 2:
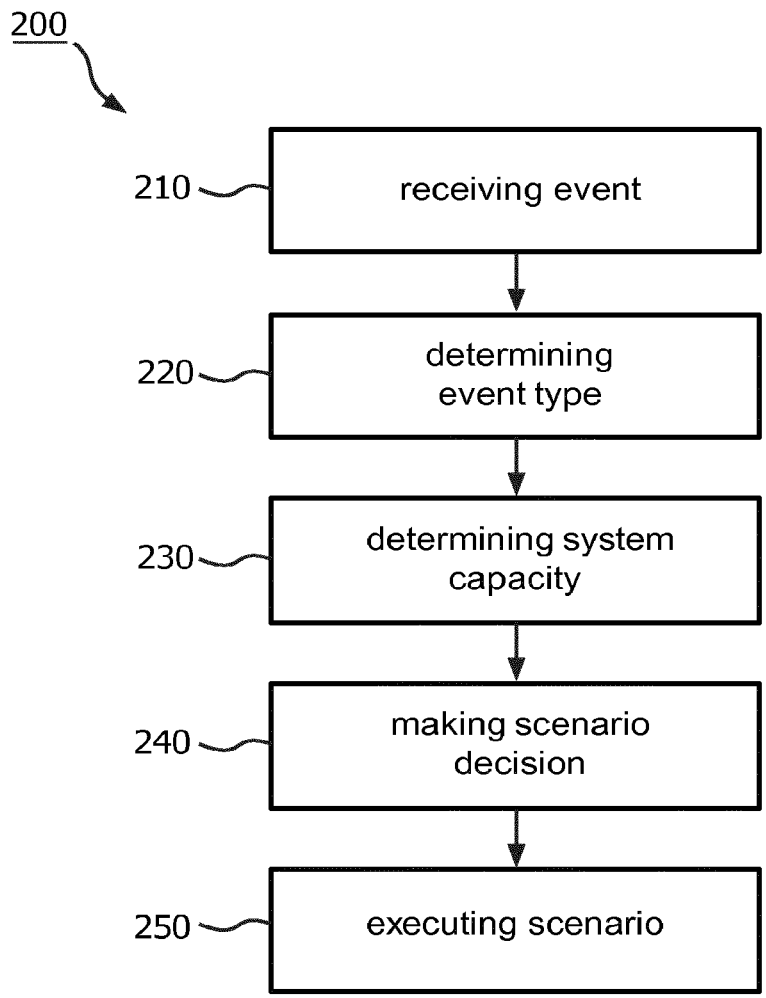
FIG. 2 shows schematically and exemplarily a method for allowing an application to render a light effect via a networked lighting system according to the invention.

In FIG. 2 a graphical representation of a method 200 for allowing an application to render a light effect via a networked lighting system according to the invention is shown. The method 200 comprises receiving an event 210, the event related to a light effect for being rendered by the networked lighting system. Such an event can for example be received from an application, such as game code executed on a computer, over an API. The method further comprises determining an event type 220 of the received event. Examples of event types are lighting scene changes, such as a scene change from a cool white to warm white ambience, and lighting feedback, such as an intense light flash. Such event types can relate to actions taken by a user which cause a character in a computer game to move from an outside environment covered in snow (related to cool white light) to an inside environment in a house with the fire place on (related to warm white light) or actions taken by the user that cause the computer game character to collect an extra life (related to an intense light flash).

The method further comprises determining a capacity of the networked lighting system 230. The capacity can be determined based on a predetermined threshold, for example: one lighting command per second, ten lighting commands per two seconds, three lighting commands of a first type (e.g. related to a unicast message) or one lighting command of a second type (e.g. related to a multicast message) per second. In various embodiments the capacity can be determined based on the number of lighting commands or messages sent in a predetermined time period, the queue of lighting commands or messages in a buffer (e.g. in a buffer of a gateway or a network device), a service offered by the networked lighting system that monitors capacity, etc.

The method further comprises deciding based on the determined capacity of the networked lighting system and/or the determined event type, to execute a first or a second scenario 240; and executing the first scenario, comprising sending a lighting control command, for rendering the light effect related to the event received, to the networked lighting system or executing the second scenario, wherein the light effect related to the event received is not rendered by the networked lighting system 250. As a first operational example, it can be determined that the network capacity is sufficient for the light effect to be rendered and the first scenario is executed, wherein a lighting control command is sent to the networked lighting system to render the light effect. As a second operational example, it can be determined that the network capacity is insufficient for the light effect to be rendered and the second scenario is executed by not sending a control command to the networked lighting system and effectively dismissing the event received. As a third operational example, it can be determined that the network capacity is low (e.g. beneath a predetermined value) and the second scenario is executed by determining an approximate light effect and sending a control command to the lighting system to render the approximate light effect. As a fourth operational example, it can be determined that the event type of the light effect that is to be rendered is of the first type and therefore the first scenario is executed, effectively always sending a lighting control command to the networked lighting system independent of the determined system capacity. As a fifth operational example, it can be determined that the event type of the light effect that is to be rendered is of the second type and therefore the second scenario is executed by effectively dismissing the event received. As a sixth operational example, it can be determined that the capacity of the networked lighting system is low (e.g. only one more command can be sent in the next second) and the first scenario is executed if the event is of the first event type whereas the second scenario will be executed if the event is of the second event type. There are numerous other variations related to making a scenario decision and executing the scenario.

Figure 3A:
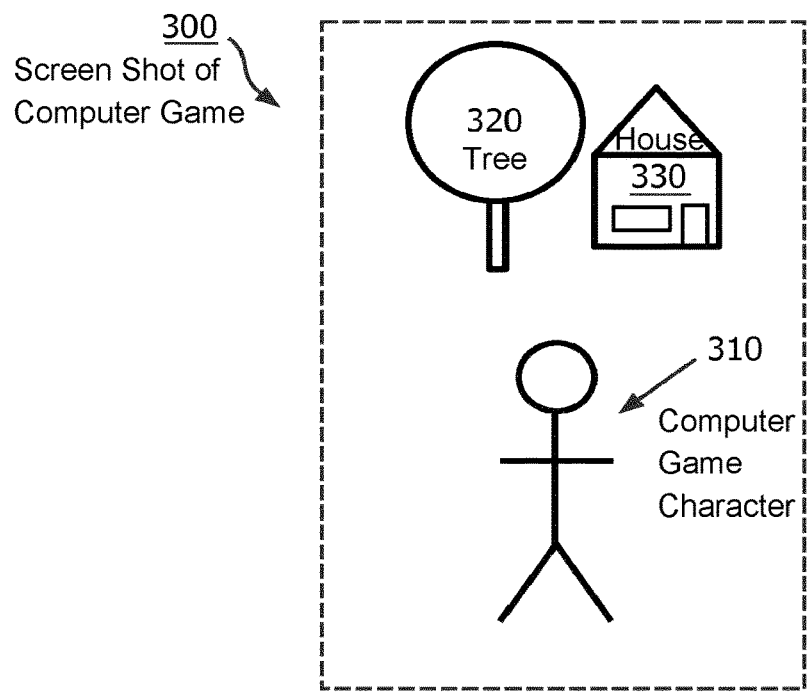
FIG. 3A and FIG. 3B show schematically and exemplarily screen shots of a computer game where a character is positioned in a first position related to a first light effect and a second position related to a second light effect, respectively.
Figure 3B:
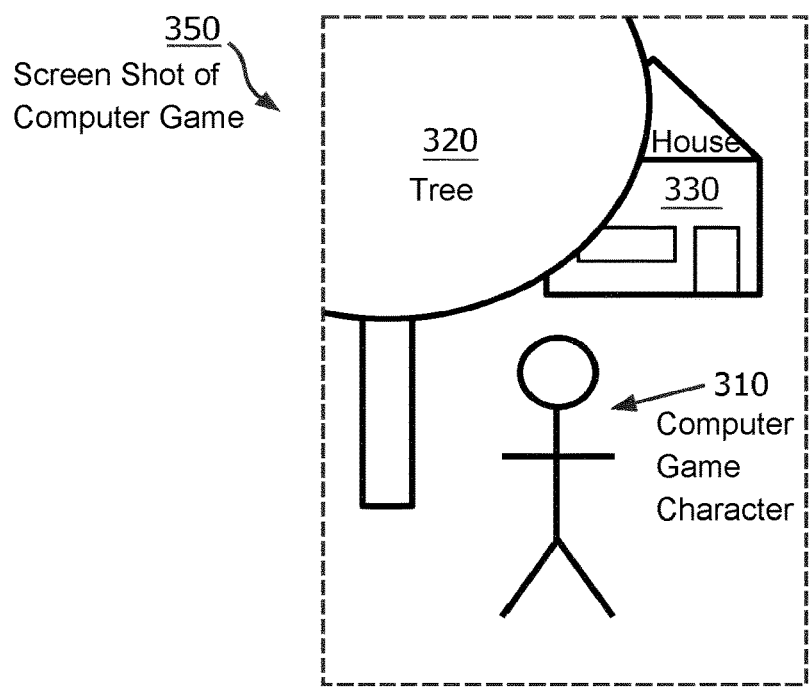
Figure 4A:
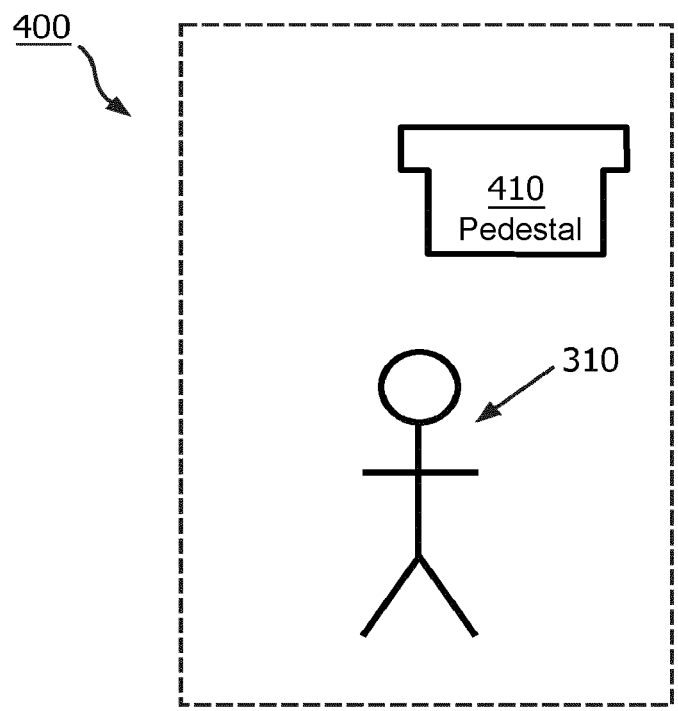
FIG. 4A and FIG. 4B show schematically and exemplarily screen shots of a computer game where a character in a first scenario is not interacting with an object and in a second scenario is interacting with the object, respectively, the interaction with the object related to a light effect.
Figure 4B:
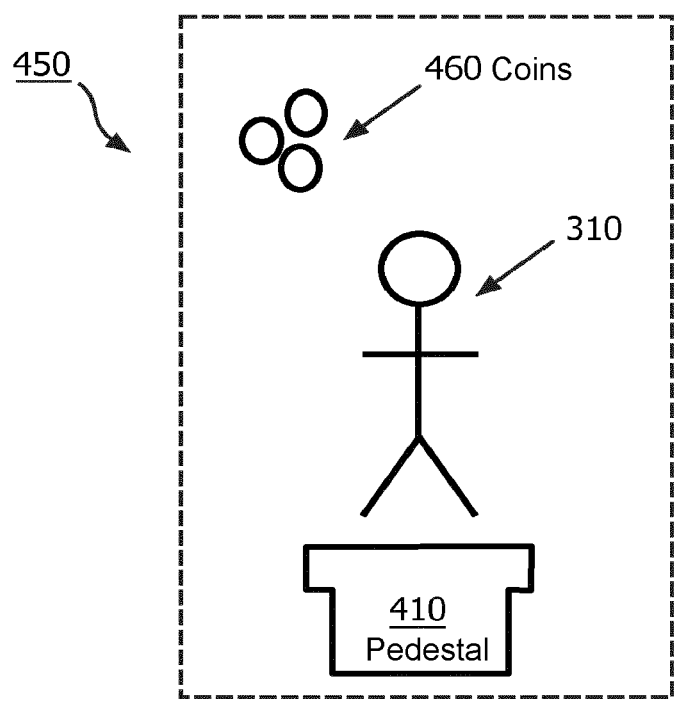
Figure 5A:
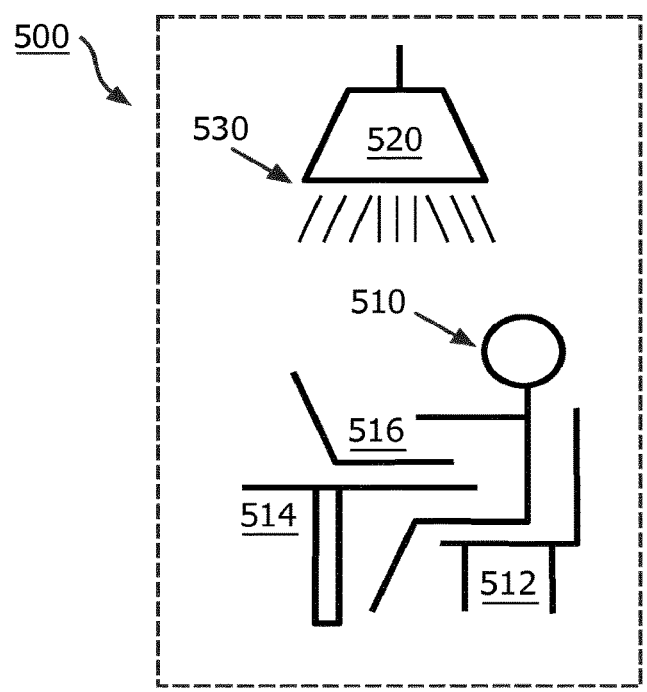
FIG. 5A and FIG. 5B show schematically and exemplarily a scene of a user playing a computer game where a lighting device renders a first light effect and a second light effect, respectively.
Figure 5B:
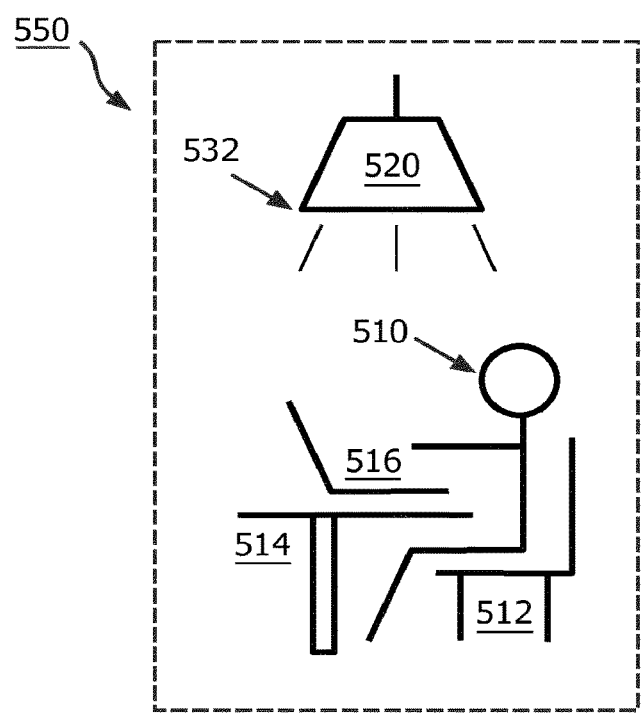

In FIG. 3A, FIG. 3B, FIG. 4A, FIG. 4B, FIG. 5A and FIG. 5B an example of an implementation of the method according to the invention is provided. FIG. 3A and FIG. 3B each show a position of a computer game character in order to illustrate an event related to a scene change. FIG. 4A and FIG. 4B each show a position of a computer game character in order to illustrate an event related to a lighting feedback. FIG. 5A and FIG. 5B each show a user of a computer game and a lighting device. More specifically, in FIG. 3A and FIG. 3B, a first image 300 rendered by a computer gaming system is shown, the image comprising a computer game character 310 having a certain distance to a tree 320 and a house 330. The computer gaming system can relate this to a light effect, such as a lighting scene appropriate for a sunny day. When the user moves the computer game character closer to the house 330 this can lead to the computer gaming system rendering a second image 350 wherein the computer game character 310 has moved closer to the house 330 and therefore stands underneath the tree 320. The computer gaming system can relate this to a light effect, such as a lighting scene appropriate for receiving shade from a tree. In this example, both light effects relate to a lighting scene. The computer gaming system can render the appropriate light effect via the networked lighting system. FIG. 4A and FIG. 4B show an example wherein the light effect relates to lighting feedback. The computer game character 310 in the third image 400 rendered by the computer gaming system, is in the vicinity of a pedestal 410 which, as part of the game design, allows a user to collect points in the game. When the user controls the computer game character 310 to jump on the pedestal 410, the user is given feedback that points have been collected through showing, in the fourth image 450, an image of coins 460. In this example, additional feedback can be given through the networked lighting system, such as by temporarily increasing the light output. The rendering of a light effect is shown in FIG. 5A and FIG. 5B, where in a first representation 500 of a user playing a computer game, the user 510 is seen sitting on a chair 512 behind a desk 514, the user operating a computer gaming system 516, such as a laptop running a computer game. In the first representation 500 a lighting device 520 renders a first light effect 530 and in a second representation 550 the lighting device 520 renders a second light effect 532.

In a first example, the first light effect 530 is emitting bright white light and the second light effect 532 is emitting dimmed white light. The light effect 530, 532 being rendered by the networked lighting system is related to an event in a virtualized environment provided by the computer gaming system. The computer game character 310 positioned in sunlight, as in the first image 300, can relate to the first light effect; and the computer game character 310 positioned in the shade of the tree 320, as in the second image 350, can relate to the second light effect. If the networked lighting system is rendering the first light effect, then when the user 510 moves the computer game character 310 closer to the house 330, this can lead to the computer gaming system rendering the second image 350 as well as the generation of a first event related to the lighting scene change (i.e. the lighting scene changing from bright white light to dimmed white light). The lighting device 520 can transition from rendering the first light effect 530 to rendering the second light effect 532.

In a second example, the second light effect 532 is a short flash of red light and this effect is related to the computer game character 310 collecting points, such as by jumping on the pedestal 410. When the user 510 controls the computer game character 310 to jump on the pedestal 410 the lighting device 520 should render the second light effect 532 and as such the computer gaming system will generate a second event related to this second light effect.

A light effect can relate to an indefinite change in light output (e.g. a light effect is rendered until a subsequent light effect is rendered) or temporary changes in light output (e.g. a light effect is rendered for a period of time before the lighting device returns to its original state). A light effect can relate to color, color rendering index, saturation, brightness, beam angle, beam focus or any other light variable.

The lighting engine 150 executing the method according to the invention and receiving the first and/or the second event referred to above, will determine the event type of the event received. In this example, the first event is related to the first event type and the second event is related to the second event type. The first event type relates to rendering a scene and the second event type relates to rendering lighting feedback. To provide a satisfactory user experience, it is critical that the scene change is executed, however this is less time critical than the execution of the lighting feedback. As an example, assume the user 510 controls the computer game character 310 to move underneath the tree 320. The lighting device 520 should render the second light effect 532, which in this case is dimming the white light. If this light effect is not rendered, this creates a bad user experience. Now assume the user 510 controls the computer game character 310 to jump on the pedestal 410. The lighting device 520 should render the second light effect 532, which in this case is emitting a flash of red light. If this light effect is rendered late (e.g. out of sync with the image rendered by the computer gaming system), this creates a bad user experience. As such, in this example, if the capacity of the networked lighting system is such that a light effect will (likely) be rendered with a delay, the lighting engine should send a control command to the networked lighting system to render the lighting scene change (in this example, dimming the light), yet should not send a control command to render the lighting feedback (in this example, the flash of red light).

Figure 6:
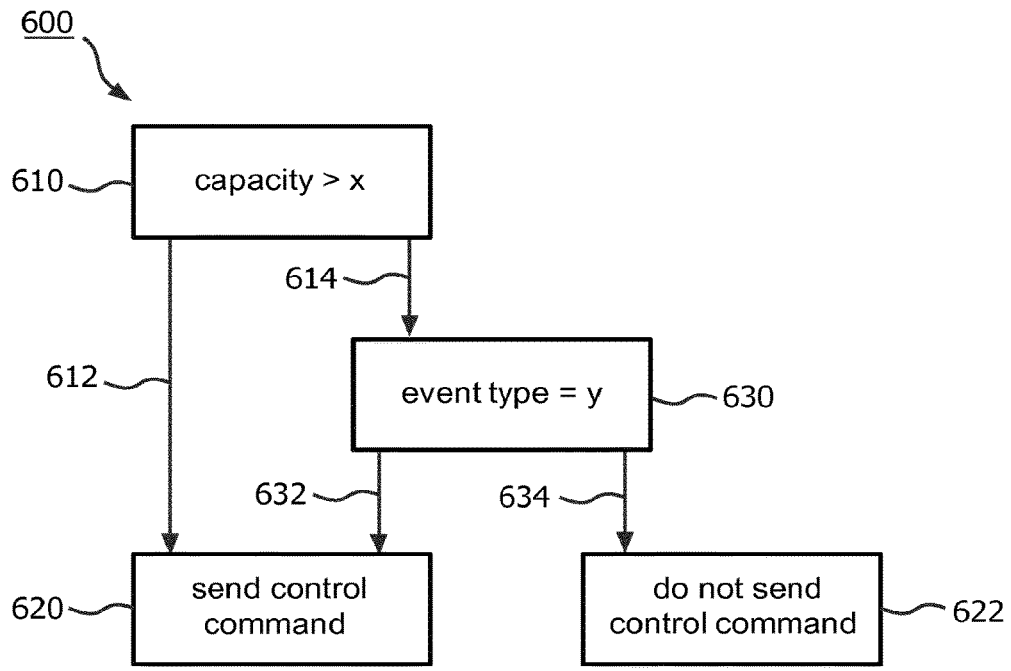
FIG. 6 shows schematically and exemplarily a decision tree for determining what scenario to execute in relation to the determined capacity of the networked lighting system and the determined event type of the event received.

In FIG. 6 a decision tree 600 is shown related to the example illustrated above. In a first step 610 in the decision tree, the question is "is the capacity of the networked lighting system greater than a (predetermined) value x"; if "yes" then follow path 612 and continue to the first outcome 620 of the decision tree of sending the control command; if "no" then follow path 614 and second step 630. In the second step 630 the question is "is the event received of event type y"; if "yes" then follow path 632 and continue to the first outcome 620 of the decision tree of sending the control command; if "no" then follow path 634 and continue to the second outcome 622 of the decision tree of not sending the control command. The lighting engine 150 receiving the first event related to the first event type as per the example above (i.e. the event related to the lighting scene change, in this example the dimming of the white light) or the second event related to the second event type as per the example above (i.e. the event related to the lighting feedback, in this example the flash of red light), can execute the steps of this decision tree 600 as part of executing the method according to the invention. The lighting engine determines the capacity of the networked lighting system is above value x and as such the capacity is sufficient for a lighting control command to be rendered without a delay (e.g. within a predetermined time period, within a predetermined time period with a certain likelihood, or without any known or anticipated delays). If the capacity is sufficient, then a lighting control command will be sent to the networked lighting system irrelevant of whether the event received is of the first or the second event type. However if the capacity is insufficient, then the lighting engine 150 executing the steps of the decision tree 600 will consider the event type of the event received and, in this exemplary situation, send a control command if the event received is of the first event type (i.e. the lighting scene change), yet not if it is of the second event type (i.e. the lighting feedback).

Figure 7:
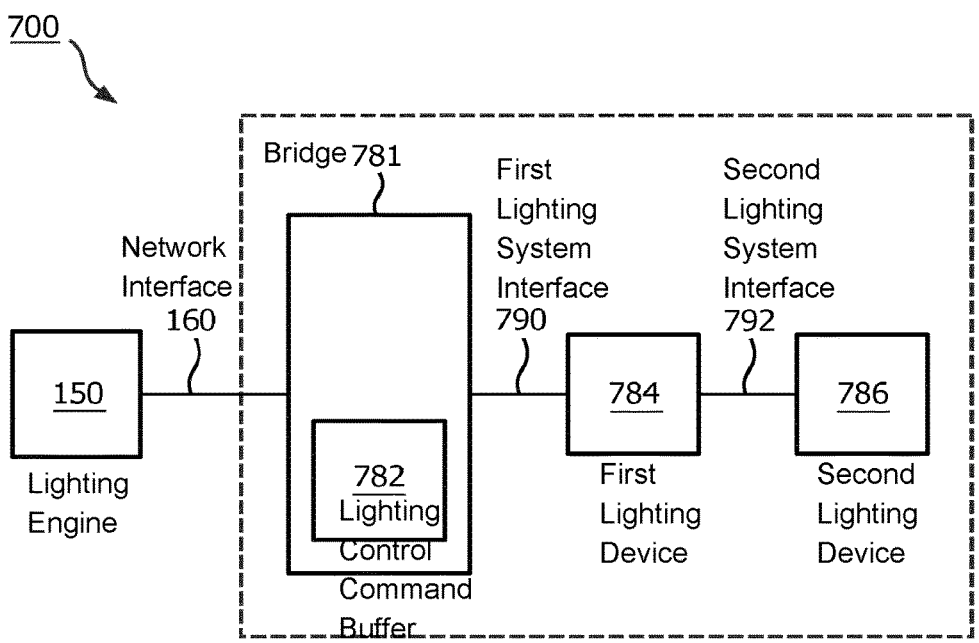
FIG. 7 shows schematically and exemplarily the routing of a lighting command in a lighting system.

In FIG. 7 some details are shown of where a delay can occur in a networked lighting system, by providing insight into the routing of a lighting control command in such a system. This exemplary networked lighting system 700 comprises a bridge 781 with a lighting control command buffer 782, as well as a first lighting device 784 and a second lighting device 786. The lighting engine 150 interfaces over the network interface 160 to the bridge 781. In this example, the lighting engine 150 and the bridge 781 can be part of an Ethernet network and these devices interface over this Ethernet network. The bridge interfaces with a first lighting device 784 over a first lighting system interface 790 and the first lighting device interfaces with the second lighting device over a second lighting system interface 792. In this example, the lighting devices can be part of a ZigBee network and the bridge 781 is able to reach the first lighting device 784 directly over the ZigBee network, yet reaches the second lighting device 786 indirectly over this network (e.g. because the second device 786 is out of reach of the radio link of the bridge 781). The capacity of the networked lighting system to process lighting control command depends on a multitude of factors, some of which are: the number (and/or type) of commands in the buffer 782 of the bridge 781, the number (and/or type) of lighting control commands being dispersed over the radio channel(s) of the networked lighting system, the delay caused by the processing of the bridge 781, the delay caused by the processing of the lighting device 784, 786 that has to execute the lighting control command, the delay caused by the first lighting device 784 relaying the lighting control command to the second lighting device 786.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A computer implemented method for allowing an application to render a light effect via a networked lighting system, the method comprising:
   receiving an event from the application, the event related to a light effect for being rendered by the networked lighting system,
   determining an event type, from a set of event types, of the event received, wherein the set of event types comprises at least a first event type and a second event type,
   determining a capacity of the networked lighting system for executing a lighting control command,
   selecting for execution a scenario from a set of scenarios based on the determined capacity of the networked lighting system and the determined event type, wherein the set of scenarios comprises at least a first and a second scenario, and
   executing the selected scenario,
   wherein the first scenario comprises sending one or more lighting control commands for rendering the light effect related to the event received to the networked lighting system, and the second scenario comprises dismissing the event received by not sending a lighting control command to the networked lighting system.

2. The computer implemented method of claim 1, wherein the set of scenarios further comprises a third scenario comprising:
   determining an approximate light effect based on the light effect related to the event received, and
   sending one or more lighting control commands, for rendering the approximate light effect, to the networked lighting system.

3. The computer implemented method of claim 2, wherein the number of lighting control commands required to render the light effect related to the event received is greater than the number of lighting control commands required to render the approximate light effect.

4. The computer implemented method claim 2, wherein the number of lighting devices required to render the approximate light effect is smaller than the number of lighting devices required to render the light effect related to the event received.

5. The computer implemented method of claim 1, wherein determining the capacity of the networked lighting system is based on a predetermined value indicative of an expected number of lighting control commands for which the networked lighting system has capacity.

6. The computer implemented method of claim 1, wherein determining the capacity of the networked lighting system is based on a first predetermined value indicative of an expected number of lighting control commands of a first type for which the networked lighting system has capacity and a second predetermined value indicative of an expected number of lighting control commands of a second type for which the networked lighting system has capacity.

7. The computer implemented method of claim 1, wherein determining the capacity of the networked lighting system is based on a number of lighting control commands stored in a buffer of a device in the networked lighting system.

8. The computer implemented method of claim 1, wherein determining the capacity of the networked lighting system is based on measuring the amount of network traffic present in the networked lighting system.

9. The computer implemented method of claim 1, wherein the first scenario is executed when the event received is of the first event type,
   wherein the first event type relates to a light effect for which successful rendering by the networked lighting system is of high importance.

10. The computer implemented method of claim 1, wherein the second scenario is executed when the event received is of the second event type, and the determined capacity of the networked lighting system is indicative of an expected delay, above a predetermined threshold, in rendering the light effect related to the event received,
    wherein the second event type relates to a light effect for which timely rendering by the networked lighting system is of high importance.

11. The computer implemented method of claim 9, wherein the light effect for which successful rendering by the networked lighting system is of high importance relates to a lighting scene change based on a virtual character moving, in a virtual environment provided by the application, from a first location to a second location, and
    wherein the first location is related to a first lighting scene and the second location is related to a second lighting scene different from the first lighting scene.

12. The computer implemented method of claim 9, wherein the light effect for which timely rendering by the networked lighting system is of high importance relates to a lighting feedback triggered by an event occurring in a virtual environment provided by the application.

13. The computer implemented method of claim 1, wherein the networked lighting system comprises one or more lighting devices arranged for receiving lighting control commands over a mesh network, and wherein sending a lighting control command, for rendering the light effect related to the event received, comprises sending a message over the mesh network.

14. A computer program product comprising program code for causing a computer to carry out the method of claim 1, when the computer program product is carried out on the computer.

15. A networked lighting system control device for controlling a networked lighting system, the networked lighting system control device comprising:
    an input arranged for receiving an event related to a light effect for being rendered by the networked lighting system,
    a network interface arranged for sending a lighting control command to the networked lighting system, and
    a processor operationally coupled to the input and the network interface, wherein the processor is arranged for:
       determining an event type, from a set of event types, of the event received, wherein the set of event types comprises at least a first event type and a second event type,
       determining a capacity of the networked lighting system for executing a lighting control command,
       selecting for execution a scenario from a set of scenarios based on the determined capacity of the networked lighting system and the determined event type, wherein the set of scenarios comprises at least a first and a second scenario, and
       executing the selected scenario, wherein the first scenario comprises sending a lighting control command for rendering the light effect related to the event received to the networked lighting system, and the second scenario comprises dismissing the event received by not sending a lighting control command to the networked lighting system.

* * * * *